(12) United States Patent
Wang

(10) Patent No.: US 8,947,716 B2
(45) Date of Patent: Feb. 3, 2015

(54) INFORMATION STORAGE DEVICE AND IMAGE FORMING CARTRIDGE FOR IMAGE FORMING APPARATUS

(71) Applicant: Apex Microelectronics Company Limited, Zhuhai (CN)

(72) Inventor: Dongjie Wang, Zhuhai (CN)

(73) Assignee: Apex Microelectronics Company Limited, Guangdong (CN)

( * ) Notice: Subject to any disclaimer, the term of this patent is extended or adjusted under 35 U.S.C. 154(b) by 0 days.

(21) Appl. No.: 14/083,027

(22) Filed: Nov. 18, 2013

(65) Prior Publication Data
US 2014/0078552 A1   Mar. 20, 2014

Related U.S. Application Data

(63) Continuation of application No. PCT/CN2012/078713, filed on Jul. 16, 2012.

(51) Int. Cl.
*G06K 15/00* (2006.01)
*G03G 15/00* (2006.01)

(52) U.S. Cl.
CPC ............ *G06K 15/4075* (2013.01); *G03G 15/50* (2013.01); *G06K 15/00* (2013.01)
USPC ............................. 358/1.15; 358/1.16; 399/25

(58) Field of Classification Search
None
See application file for complete search history.

(56) References Cited

U.S. PATENT DOCUMENTS

| | | | | |
|---|---|---|---|---|
| 5,699,091 A | * | 12/1997 | Bullock et al. | 347/19 |
| 6,351,621 B1 | * | 2/2002 | Richards et al. | 399/111 |
| 6,385,407 B1 | * | 5/2002 | Inose | 399/24 |
| 8,638,457 B2 | * | 1/2014 | Cha | 358/1.15 |
| 8,649,048 B2 | * | 2/2014 | Ajima | 358/1.16 |
| 2005/0078971 A1 | * | 4/2005 | Suzuki | 399/25 |

FOREIGN PATENT DOCUMENTS

| | | |
|---|---|---|
| CN | 101692347 A | 4/2010 |
| CN | 101734018 A | 6/2010 |
| CN | 101825860 A | 9/2010 |
| JP | 10-49320 | 2/1998 |
| JP | 11-20184 | 1/1999 |

OTHER PUBLICATIONS

International Search Report of corresponding international PCT application No. PCT/CN2012/078713, dated Dec. 6, 2012.

\* cited by examiner

*Primary Examiner* — Thomas D Lee
(74) *Attorney, Agent, or Firm* — J.C. Patents

(57) ABSTRACT

The present invention provides an information storage device and an image forming cartridge for an image forming apparatus. The information storage device comprises at least two communication interfaces, at least two storage units, a detection unit, a first control unit and a second control unit, wherein the communication interfaces are configured to connect with a controller in the image forming apparatus and establish an information communication path between the first control unit and the controller in the case of being connected with the controller; the storage units and the communication interfaces are arranged corresponding to each other; the detection unit is connected with each foregoing communication interface; the first control unit and the second control unit are respectively connected with each foregoing storage unit and the detection unit. By adoption of the information storage device, the quality of executing the task of the image forming apparatus can be improved.

18 Claims, 5 Drawing Sheets

INFORMATION STORAGE DEVICE AND IMAGE FORMING CARTRIDGE FOR IMAGE FORMING APPARATUS

CROSS-REFERENCE TO RELATED APPLICATIONS

This application is a continuation of International Application No. PCT/CN2012/078713 filed on Jul. 16, 2012. The content of the above identified application is incorporated herein by reference in its entirety.

FIELD OF THE TECHNOLOGY

The present invention relates to information processing technology, in particular to an information storage device and an image forming cartridge for an image forming apparatus.

BACKGROUND

In image forming apparatuses such as various types of printers, copiers, fax machines or all-in-one multifunctional machines with the combination of several above functions, image forming cartridges (i.e., ink cartridges, toner cartridges, etc.) mounted therein are utilized for image forming. For example, an inkjet printer achieves image forming by spraying ink in ink cartridges onto paper, and a laser printer achieves image forming by the transfer printing of toner in toner cartridges onto paper and hence heating. The image forming apparatus mainly comprises an image forming cartridge, a controller and other executing element for executing image forming, and a colorant (for example, ink in an ink cartridge or toner in a toner cartridge) is accommodated in the image forming cartridge.

When the image forming apparatus executes the image forming task, the colorant is gradually used out. Therefore, information storage devices are mounted on ink cartridges and toner cartridges by many original manufacturers and configured to record the product information of the ink cartridges or the toner cartridges and the consumption of the colorant. The consumption of the colorant is rewritten into the information storage devices in real time during the image forming of the image forming apparatuses. The information storage devices cannot be reset, and cannot be read in again or cannot be identified by the image forming apparatuses after the colorant is used out.

The ink cartridges or the toner cartridges provided by the original manufacturers are expensive and usually disposable products, but many users hope to independently add the colorant into the image forming cartridges so as to repetitively use the image forming cartridges after the colorant is used out. Therefore, the resettable information storage devices occur in the market. When the colorant is used out, the information storage device is restored to the bran-new state by the reset of the information stored therein, and hence the image forming apparatus can identify the information storage device again and the user can refill the ink cartridge or the toner cartridge with the colorant. Therefore, the ink cartridge or the toner cartridge can be repetitively used and the cost can be greatly reduced.

FIG. 1 is a schematic structural view illustrating the state when an information storage device in the prior art is arranged on an image forming cartridge in an image forming apparatus. As illustrated in FIG. 1, the information storage device 100 comprises a circuit board 101, a storage unit 102, a communication interface 103 and a control unit 104, and the image forming cartridge comprises a cartridge body 200 and an ink outlet 201, wherein the storage unit 102, the communication interface 103 and the control unit 104 are respectively arranged on the circuit board 101; the storage unit 102 and the communication interface 103 are respectively connected with the control unit 104; the circuit board 101 is mounted on the cartridge body 200 through a fixing rod 202; and a colorant is accommodated in the cartridge body 200.

After the image forming cartridge is mounted on the image forming apparatus, the storage unit in the information storage device is connected with a controller in the image forming apparatus through the communication interface; information related to the image forming cartridge, such as the manufacturer of the image forming cartridge, the date of manufacture, the effective duration, the expiration date, the product number, the identification code, the type of the image forming cartridge, the color of the colorant in the image forming cartridge, etc., is stored into the storage unit which can be communicated with the controller in the image forming apparatus; and the controller can acquire the information stored therein from the storage unit and match the relevant information, such as the product number, the identification code or the like, in the information with a predetermined identification mark in the controller. In the case of successful matching, it indicates that the image forming cartridge is applicable to the image forming apparatus, and thus the image forming apparatus can utilize the image forming cartridge to execute the corresponding image forming operation.

The controller can also generate corresponding change information, such as the remaining amount or the consumption of the colorant in the image forming cartridge, according to the use state of the image forming apparatus. When the image forming task is executed, the controller can calculate the consumption or the remaining amount of the colorant in the image forming cartridge in real time and transmit the information to the storage unit in real time so that the information can be stored into the storage unit.

As for the resettable information storage device, in general, the image forming apparatus transmits the change information to the storage unit when finishing the image forming task each time, and acquires the change information from the storage unit again when executing the next image forming task. The controller generates information, prompting that the colorant is used out or insufficient, to prompt the user to replace the image forming cartridge when determining that the colorant is used out or insufficient through the change information. Moreover, the control unit can determine the consumption of the colorant by the change information and reset the change information stored into the storage unit, namely rewriting the information related to the consumption or the remaining amount into the initial state information, that is to say, into the state indicating that the colorant in the image forming cartridge is full, when determining that the colorant is used out. And hence, the user can replace the image forming cartridge so that the image forming apparatus can continue to execute the image forming task.

However, when the control unit determines that the colorant is used out or insufficient by the change information and hence resets the change information in the storage unit, if the user does not replace the image forming cartridge in time or refill the image forming cartridge with the colorant in time but the change information in the storage unit has been reset, the change information may be inconsistent with the actual state of the image forming cartridge. At this point, the controller continues to control a corresponding component in the image forming apparatus to execute the image forming task but the image forming apparatus cannot execute the image forming task again after the colorant in the image forming cartridge has been actually used out. Therefore, the image forming process can be interrupted. Moreover, if the image forming apparatus utilizes thermal inkjet printing, a print head may be directly damaged in the case of continuous printing without ink.

SUMMARY

In one respect, the present invention provides an information storage device for an image forming apparatus to improve the quality of executing the image forming task of the image forming apparatus.

The information storage device for the image forming apparatus, provided by the present invention, comprises:

at least two communication interfaces configured to connect with a controller in the image forming apparatus and establish an information communication path between a first control unit and the controller in the case of being connected with the controller;

at least two storage units arranged corresponding to the communication interfaces and configured to store variable information and backup information of an image forming cartridge in the image forming apparatus, in which the variable information at least includes first product information and image forming change information, and the backup information at least includes initial state information of the image forming cartridge;

a detection unit connected with each foregoing communication interface and configured to detect the state of each foregoing communication interface and generate a first trigger signal and a second trigger signal when determining and acquiring that one communication interface is connected with the controller;

the first control unit respectively connected with each foregoing storage unit and the detection unit and configured to acquire the variable information in the storage unit corresponding to the communication interface connected with the controller when receiving the first trigger signal, send the variable information to the controller, and send updated image forming change information, sent by the controller through the communication interface, to the storage unit corresponding to the communication interface so that the information can be stored into the storage unit; and a second control unit respectively connected with each foregoing storage unit and the detection unit and configured to at least rewrite the image forming change information in the storage unit corresponding to the communication interface disconnected with the controller into the backup information when receiving the second trigger signal.

In another aspect, the present invention provides an image forming cartridge arranged inside an image forming apparatus, wherein an information storage device provided by the present invention is arranged on the image forming cartridge; a controller on the image forming apparatus is connected with one communication interface in the information storage device; and the controller is configured to receive variable information in a storage unit corresponding to a communication interface connected with the controller, sent by a first controller unit in the information storage device, and send generated updated image forming change information to the storage unit corresponding to the communication interface through the communication interface so that the information can be stored into the storage unit.

The information storage device for the image forming apparatus, provided by the present invention, at least comprises the two communication interfaces, the two storage units, the detection unit, the first control unit and the second control unit. After the information storage device is arranged on the image forming cartridge of the image forming apparatus, one communication interface is connected with the controller in the image forming apparatus but other communication interfaces are not connected with the controller. The detection unit can detect the state of each foregoing communication interface in real time and determine which communication interface is connected with the controller and which communication interface is disconnected with the controller at the current moment by the detection of the state of each foregoing communication interface, and generates the first trigger signal and the second trigger signal when determining that one communication interface is connected with the controller. When receiving the first trigger signal, the first control unit acquires the variable information of the image forming cartridge from the storage unit corresponding to the communication interface and transmits the variable information to the controller through the communication interface so that the controller can utilize the information. Moreover, when receiving the second trigger signal, the second control unit at least rewrites the image forming change information in the storage unit corresponding to the communication interface disconnected with the controller into the backup information.

When a user replaces the image forming cartridge with a new one each time or refills the image forming cartridge with a colorant, after the information storage device is arranged on the image forming cartridge and used again, the image forming change information in the storage unit corresponding to the communication interface connected with the controller is consistent with or similar to the initial state information after the replacement of the image forming cartridge, that is to say, the state after the replacement of the image forming cartridge can be relatively accurately indicated. Compared with the prior art, the following case can be avoided: when the control unit determines that the colorant is used out or insufficient through the change information and automatically resets the change information in the storage unit but the user does not replace the image forming cartridge or refill the image forming cartridge with the colorant, the change information is inconsistent with the actual state of the image forming cartridge.

By adoption of the information storage device provided by the present invention, when the colorant is used out or insufficient, the information storage device cannot be automatically reset. At this point, the image forming apparatus stops executing the image forming task until the user replaces the image forming cartridge or refills the image forming cartridge with the colorant. And meanwhile, after the information storage device is removed and arranged on the replaced image forming cartridge or rearranged on the image forming cartridge refilled with the colorant and another communication interface is connected with the controller, the controller in the image forming apparatus can acquire relatively accurate image forming change information from the information storage device, and hence the following problem can be avoided: the controller continues to generate a control signal to control a corresponding component in the image forming apparatus to execute the image forming task due to the acquisition of improper image forming change information, but actually the colorant has been used out and the image forming task cannot be finished, and hence the image forming process can be interrupted. Therefore, the quality of executing the image forming task of the image forming apparatus can be improved.

DETAILED DESCRIPTION

The embodiment of the present invention provides an information storage device for an image forming apparatus. The information storage device is a component applied to the image forming apparatus and can be arranged inside an image forming cartridge for the image forming apparatus.

The image forming apparatus mainly comprises the image forming cartridge, a controller and other executing element for executing image forming, wherein a colorant is accommodated in the image forming cartridge; the information storage device is arranged on the image forming cartridge; information related to the image forming cartridge is stored into the information storage device; the controller is a control element of the image forming apparatus and can acquire the information stored therein from the information storage device and match the product number, the identification code or the like in the information with a predetermined identification mark in the controller. In the case of successful matching, it indicates that the image forming cartridge can be applied to the image forming apparatus. In this case, the controller generates a control signal according to a corresponding operation instruction, and the image forming executing element executes the corresponding image forming task according to the control signal and sprays the colorant in the image forming cartridge onto a medium to achieve the image forming effect.

Figure 1:
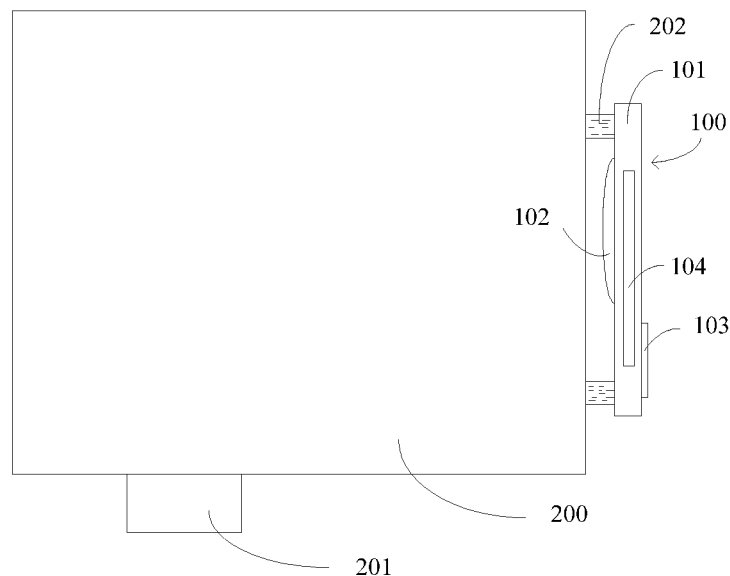
FIG. 1 is a schematic structural view illustrating the state when an information storage device in the prior art is arranged on an image forming cartridge in an image forming apparatus.
Figure 2:
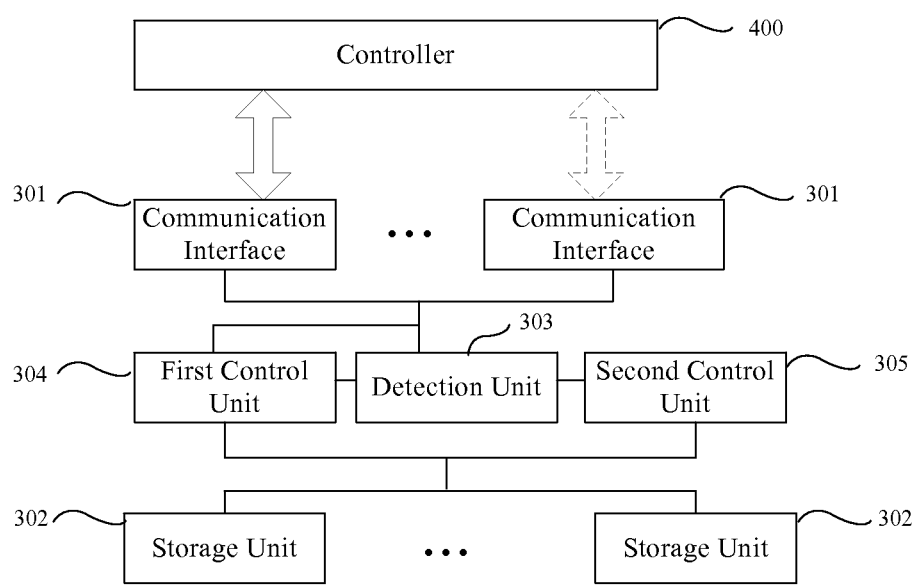
FIG. 2 is a schematic structural view of an information storage device for an image forming apparatus, provided by an embodiment of the present invention.

FIG. 2 is a schematic structural view of an information storage device for an image forming apparatus, provided by an embodiment of the present invention. As illustrated in FIG. 2, the information storage device comprises at least two communication interfaces 301, at least two storage units 302, a detection unit 303, a first control unit 304 and a second control unit 305.

At least two communication interfaces 301, the communication interfaces 301 are configured to connect with a controller 400 in the image forming apparatus and establish an information communication path between the first control unit 304 and the controller 400 in the case of being connected with the controller 400.

The communication interface is arranged between the control unit of the information storage device and the controller in the image forming apparatus and configured to establish the information communication path between the first control unit and the controller, and achieves the information interaction between the first control unit and the controller when the first control unit is connected with the controller through the communication interface.

The communication interface may be an electrical contact port, for example, a single-bus protocol interface, an inter-integrated circuit (I2C) bus protocol interface, an RS232 interface, an RS485 interface and the like, and achieves the connection between the control unit and the controller by wired means. Moreover, the communication interface may be also a radio frequency (RF) emitter, a Bluetooth emitter, an infrared emitter and the like, and achieves the connection between the control unit and the controller by wireless means. Each foregoing communication interface may be interfaces of the same type or interfaces of different types and can be set as required.

At least two storage units 302, the storage units 302 are arranged corresponding to the communication interfaces 301 and configured to store variable information and backup information of the image forming cartridge in the image forming apparatus, in which the variable information at least includes first product information and image forming change information, and the backup information at least includes initial state information of the image forming cartridge.

The storage units and the communication interfaces are arranged corresponding to each other. Each storage unit can be configured to store information related to the image forming cartridge, including the variable information and the backup information. Moreover, the variable information at least includes the first product information and the image forming change information, and the backup information at least includes the initial state information of the image forming cartridge.

The first product information typically includes identity attribute information of the image forming cartridge, for example, the manufacturer of the image forming cartridge, the date of manufacture, the color of the colorant, the product number, the identification code, the type of the image forming cartridge, etc.

The backup information is relevant information describing the initial state of the image forming cartridge, for example, the information related to the remaining amount, the consumption, the expiration date, the effective duration and the like of the initial state of the image forming cartridge. Moreover, the backup information may also include information identical to the first product information. The backup information is the backup of the relevant information.

The first product information and the backup information are information prestored into the storage unit. The information stored into each foregoing storage unit may be relevant information of the image forming cartridge applicable to image forming apparatuses of the same type and may also be relevant information of the image forming cartridge applicable to different types of image forming apparatuses.

The image forming change information is a number of changeable information and is relevant information generated by the controller in the image forming apparatus according to the use state of the image forming apparatus and the image forming cartridge, for example, the information related to the remaining amount and the consumption of the colorant in the image forming cartridge and the like. When the information storage device has not yet been used, the image forming change information is usually identical to or consistent with the relevant information, describing the initial state of the image forming cartridge, in the backup information.

The controller in the image forming apparatus can acquire the variable information stored therein from the storage unit and match the product number, the identification code or the like in the variable information with the predetermined identification mark in the controller. In the case of successful matching, it indicates that the image forming cartridge can be applied to the image forming apparatus, and the image forming apparatus can utilize the image forming cartridge to execute the corresponding image forming operation.

When the image forming apparatus finishes an image forming task each time, the image forming change information may be varied. According to different configurations, after the task is finished or a power supply is switched off, the controller can transmit in real time the generated updated image forming change information to the first control unit through the information communication path established through the communication interface corresponding to the storage unit, and sends the information to the storage unit for storage through the first control unit. Therefore, the storage unit will refresh in real time the image forming change information therein according to the updated image forming change information transmitted by the controller, and store the refreshed image forming change information. When executing the next image forming task, the controller acquires the refreshed information from the storage unit and generates a control signal according to an operation instruction. And hence, the image forming executing element executes the corresponding image forming operation according to the control signal and sprays the colorant in the image forming cartridge onto a medium to achieve the image forming effect.

The detection unit 303 is connected with each foregoing communication interface 301 and configured to detect the state of each foregoing communication interface 301 and generate a first trigger signal and a second trigger signal when determining and acquiring that one communication interface 301 is connected with the controller.

The first control unit 304 is respectively connected with each foregoing storage unit 302 and the detection unit 303 and configured to acquire the variable information in the storage unit 302 corresponding to the communication interface 301 connected with the controller 400, send the variable information to the controller 400, and send updated image forming change information, sent by the controller 400 through the communication interface 301, to the storage unit 302 corresponding to the communication interface 301 so that the information can be stored into the storage unit 302.

The second control unit 305 is respectively connected with each foregoing storage unit 302 and the detection unit 303 and configured to at least rewrite the image forming change information in the storage unit 302 corresponding to the communication interface 301 disconnected with the controller 400 into the backup information when receiving the second trigger signal.

The detection unit is respectively connected with each communication interface. When the information storage device is used, one communication interface is connected with the controller in the image forming apparatus but other communication interfaces are not connected with the controller, that is to say, disconnected with the controller. The detection unit can detect the state of each foregoing communication interface in real time and determine which communication interface is connected with the controller and which communication interface is disconnected with the controller at the current moment by detecting the state of each foregoing communication interface.

The detection unit generates the first trigger signal and the second trigger signal when determining that one communication interface is connected with the controller. When receiving the first trigger signal, the first control unit acquires the variable information of the image forming cartridge from the storage unit corresponding to the communication interface connected with the controller, and transmits the variable information to the controller through the communication interface so that the controller can utilize the information. Moreover, when receiving the second trigger signal, the second control unit at least rewrites the image forming change information in the storage unit corresponding to the communication interface disconnected with the controller into the backup information.

The detection unit can adopt methods in the prior art to determine the state of each communication interface. For example, the detection unit can encode each foregoing communication interface. When the communication interface is connected with the controller, the original state "0" of a voltage port in the encoded communication interface can be changed into "1", and the detection unit can acquire that the communication interface is connected with the controller through the change state of the voltage port. In addition, the state of voltage ports in the communication interfaces disconnected with the controller will not change, so that the detection unit can acquire that the communication interfaces are disconnected with the controller. Of course, the detection unit can also determine the state of each communication interface by other methods. For example, the detection unit determines the state of the communication interface by the amplitude or the frequency of the voltage of the communication interface during the signal transmission when the controller and the first control unit are subjected to information interaction. The methods are not limited to those described in the embodiment.

The information storage device can be applied to image forming apparatuses of the same type and can also be applied to different types of image forming apparatuses.

When the information storage device is applicable to image forming apparatuses of the same type, the variable information and the backup information of the image forming cartridge applicable to this type of image forming apparatuses should be stored into each of the at least two storage units in the information storage device. When the information storage device is used, the communication interfaces corresponding to the two storage units are connected with the controller of the image forming apparatus in turn. That is to say, one communication interface corresponding to one storage unit into which the relevant information of the image forming cartridge applicable to the image forming apparatus is stored can be connected with the controller at first, and the other communication interface is disconnected with the controller. When the user replaces the image forming cartridge or refills the image forming cartridge with the colorant, the information storage device is removed at the same time and arranged on the replaced image forming cartridge or rearranged on the image forming cartridge refilled with the colorant, and the communication interface corresponding to the other storage unit into which the relevant information of the image forming cartridge applicable to this type of image forming apparatuses is connected with the controller.

When the information storage device is applicable to n different types of image forming apparatuses, the variable information and the backup information related to the image forming cartridge applicable to different types of image forming apparatuses are respectively stored into at least k (k is more than or equal to n) storage units among m (m is more than or equal to n) storage units which can be accommodated in the information storage device. When the information storage device is arranged on an image forming apparatus of a certain type, the communication interface corresponding to the storage unit into which the relevant information applicable to this type of image forming apparatuses is stored is enabled to be connected with the controller of the image forming apparatus. When the information storage device is arranged on an image forming apparatus of another type, the communication interface corresponding to the storage unit into which the relevant information applicable to the image forming apparatus of the other type is enabled to be connected with the controller of the image forming apparatus. The operating principles and the advantages of the information storage device are described below through the preferred embodiments.

Supposing there is an image forming apparatus A, the information storage device is arranged on an image forming cartridge of the image forming apparatus A and provided with two storage units and two communication interfaces which are respectively recorded as a first storage unit, a second storage unit, a first communication interface and a second communication interface.

Variable information and backup information of the image forming cartridge applicable to the image forming apparatus A are prestored into both the first storage unit and the second storage unit.

When the first communication interface is connected with a controller in the image forming apparatus A, the detection unit determines that the first communication interface is connected with the controller and the second communication interface is disconnected with the controller by detecting the state of the two communication interfaces, and generates a first trigger signal and a second trigger signal. When receiving the first trigger signal, the first control unit acquires the variable information from the first storage unit corresponding to the first communication interface and transmits the variable information to the controller through the first communication interface. Moreover, when receiving the second trigger signal, the second control unit at least rewrites image forming change information in the second storage unit corresponding to the second communication interface into backup information.

When the image forming apparatus A executes the image forming task, the controller matches the acquired variable information with predetermined identification information therein at first. In the case of successful matching, the controller determines that the image forming cartridge can be applied to the image forming apparatus A and generates a control signal according to a corresponding operation instruction, and the image forming executing element executes a corresponding image forming operation according to the control signal and sprays the colorant in the image forming cartridge onto a medium to achieve the image forming effect.

When the image forming apparatus A executes the image forming task, the controller can generate updated image forming change information which is then sent to the first control unit through the first communication interface, and hence the first control unit transmits the updated image forming change information to the first storage unit which refreshes the image forming change information in real time according to the information transmitted by the controller and stores the refreshed image forming change information.

When the controller determines that the colorant is used out or insufficient according to the information in the information storage device, after the user replaces the image forming cartridge or refills the image forming cartridge with the colorant, the information storage device is removed at the same time and arranged on the replaced image forming cartridge or rearranged on the image forming cartridge refilled with the colorant, and the second communication interface is enabled to be connected with the controller in the image forming apparatus A. The detection unit determines that the second communication interface is connected with the controller and the first communication interface is disconnected with the controller by detecting the state of the two communication interfaces, and generates a first trigger signal and a second trigger signal. When receiving the first trigger signal, the first control unit acquires the variable information from the second storage unit corresponding to the second communication interface and transmits the variable information to the controller through the second communication interface. As the image forming change information in the second storage unit has been reset, namely the image forming change information is the same with the backup information, the controller can acquire that the image forming cartridge is in the initial state, namely the image forming cartridge is bran-new, after acquiring the above information. Hence, the controller generates a control signal according to a corresponding operation instruction, and the image forming executing element executes a corresponding image forming operation according to the control signal and sprays the colorant in the image forming cartridge onto a medium to achieve the image forming effect.

Moreover, when the second control unit receives the second trigger signal, the image forming change information in the first storage unit corresponding to the first communication interface is at least rewritten into the backup information, so that the image forming change information in the first storage unit can be restored to the initial state.

Similarly, when the user replaces the image forming cartridge or refills the image forming cartridge with the colorant again, the information storage device is removed at the same time and arranged on the replaced image forming cartridge or rearranged on the image forming cartridge refilled with the colorant, and the first communication interface is enabled to be connected with the controller in the image forming apparatus A again. As the image forming change information in the first storage unit corresponding to the first communication interface has been reset, the controller can acquire that the image forming cartridge is in the initial state, namely the image forming cartridge is bran-new. Hence, the controller generates a control signal according to a corresponding operation instruction, and the image forming executing element executes a corresponding image forming operation according to the control signal.

By adoption of the means, when the user replaces the image forming cartridge with a new one or refills the image forming cartridge with the colorant each time, after the information storage device is arranged on the image forming cartridge and used again, the image forming change information in the storage unit, corresponding to the communication interface connected with the controller, in the information storage device, is consistent with or similar to the initial state information after the replacement of the image forming cartridge. That is to say, the state after the replacement of the image forming cartridge can be relatively accurately indicated. Compared with the prior art, the following case cannot occur: when the control unit determines that the colorant is used out or insufficient through the change information and automatically resets the change information in the storage unit but the user does not replace the image forming cartridge or refill the image forming cartridge with the colorant, the image forming process can be interrupted or the image forming apparatus can be damaged.

By adoption of the technical proposal of the present invention, when the colorant is used out or insufficient, the information storage device cannot be automatically reset. At this point, the image forming apparatus stops executing the image forming task until the user replaces the image forming cartridge or refills the image forming cartridge with the colorant, and the information storage device is removed at the same time and arranged on the replaced image forming cartridge or rearranged on the image forming cartridge refilled with the colorant. Moreover, after the other communication interface is enabled to be connected with the controller, the controller in the image forming apparatus can acquire relatively accurate image forming change information from the information storage device, and hence the following problem can be avoided: the controller continues to generate a control signal to control a corresponding component in the image forming apparatus to execute the image forming task due to the acquisition of improper image forming change information, but the colorant has been actually used out and the image forming task cannot be finished, and hence the image forming process can be interrupted. Therefore, the quality of executing the image forming task of the image forming apparatus can be improved.

The foregoing information storage device can be also applied to different types of image forming apparatuses. For example, the information storage device comprises a plurality of communication interfaces and a plurality of storage units, and a plurality of the communication interfaces can be connected with controllers in different image forming apparatuses. At this point, variable information and backup information of an image forming cartridge applicable to different types of image forming apparatuses are prestored into a plurality of the storage units respectively.

The use method of the information storage device is similar to the methods as described in the above embodiments. The information storage device can be arranged on an image forming cartridge of an image forming apparatus at first, wherein one communication interface is connected with a controller in the image forming apparatus, and other communication interfaces are disconnected with the controller; the controller in the image forming apparatus and the information storage device are subjected to information interaction; the image forming apparatus repetitively executes the image forming task until a colorant in the image forming cartridge is used out; and hence, the information storage device can be removed from the image forming cartridge.

When an image forming cartridge in another image forming apparatus is replaced or after the image forming cartridge is refilled with the colorant, the information storage device is arranged on the image forming cartridge of the image forming apparatus; and another communication interface is enabled to be connected with a controller in the image forming apparatus, and other communication interfaces are disconnected with the controller. As image forming change information stored into the storage unit corresponding to the communication interface has been reset, the image forming change information in the storage unit is consistent with initial state information after the replacement of the image forming cartridge. The controller in the image forming apparatus and the information storage device are subjected to information interaction; the image forming apparatus repetitively executes the image forming task until the colorant in the image forming cartridge is used out; and hence, the information storage device can be removed from the image forming cartridge.

Similarly, the information storage device can be arranged inside another image forming apparatus again. The operating principles and the technical effects of the information storage device are the same with those as described in the above embodiments and will not be described further herein.

On the basis of the above embodiments, furthermore, the second control unit in the information storage device is specifically configured to at least rewrite the image forming change information in the storage unit corresponding to the communication interface disconnected with the controller into the backup information when the second trigger signal is received and the predetermined condition is met.

In the embodiment, the second control unit further determines whether to rewrite the image forming change information in the storage unit corresponding to the communication interface disconnected with the controller into the backup information according to the predetermined condition after receiving the second trigger signal.

The predetermined condition is the condition to determine whether to rewrite the image forming change information in the storage unit corresponding to the communication interface disconnected with the controller into the backup information. For example, the second control unit can read the image forming change information and the backup information in the storage unit, compares the image forming change information and the backup information, may not rewrite the image forming change information in the corresponding storage unit into the backup information if the image forming change information is not changed or slightly changed compared with the backup information, and may rewrite the image forming change information in the corresponding storage unit into the backup information if the image forming change information is greatly changed compared with the backup information.

For example, the backup information indicates the 100 percent remaining amount of the colorant in the image forming cartridge in the initial state, and the image forming change information indicates the current remaining amount of the colorant in the image forming cartridge. If the information storage device has not yet been used, the image forming change information in the first storage unit corresponding to the first communication interface connected with the controller is also the information indicating the 100 percent remaining amount of the colorant in the image forming cartridge. At this point, if the information storage device is removed by the user and arranged on the image forming apparatus again, after the second communication interface is enabled to be connected with the controller in the image forming apparatus, the first communication interface is disconnected with the controller. As the image forming change information indicating the 100 percent remaining amount of the colorant in the first storage unit is the same with the information indicating the 100 percent remaining amount of colorant in the backup information, the image forming change information is not necessarily rewritten into the backup information, namely the image forming change information is not reset.

Or alternatively, the image forming change information in the first storage unit corresponding to the first communication interface connected with the controller may indicate the 98 percent remaining amount of colorant in the image forming cartridge at certain moment. At this point, the information storage device is removed by the user and arranged on the image forming apparatus again; and the second communication interface is enabled to be connected with the controller in the image forming apparatus, and the first communication interface is disconnected with the controller. As the image forming change information indicating the 98 percent remaining amount of colorant in the first storage unit is slightly changed compared with the information indicating the 100 percent remaining amount of colorant in the backup information, the image forming change information is not necessarily rewritten into the backup information, namely the image forming change information is not reset.

In the embodiment, the storage unit is selectively reset by the setting of the predetermined condition, so that the service life of the information storage device can be prolonged.

Figure 3:
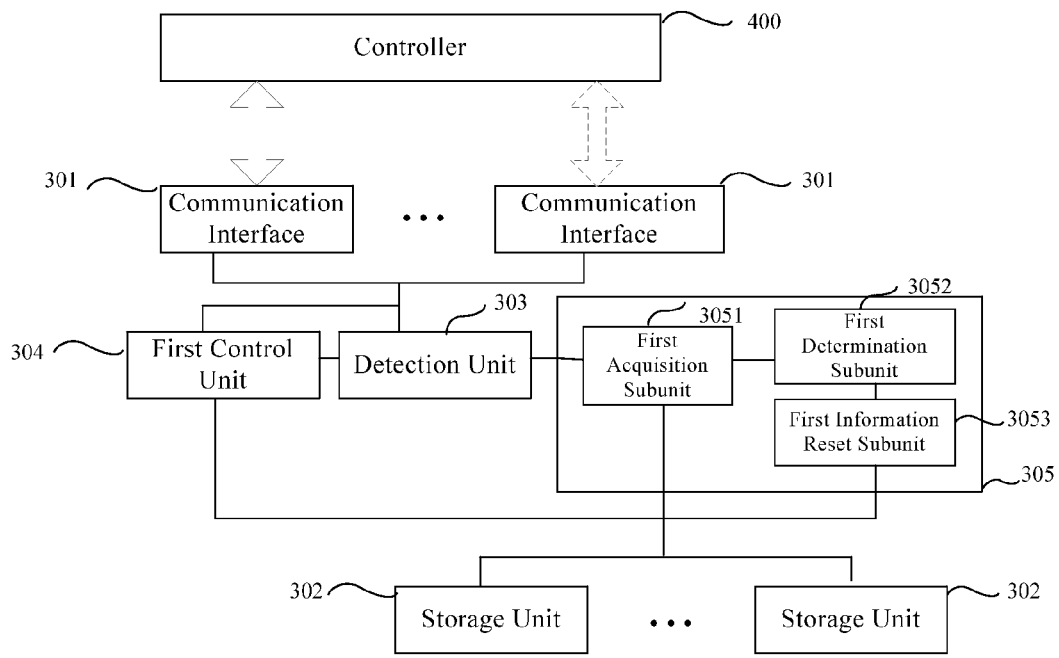
FIG. 3 is a schematic structural view of an information storage device for the image forming apparatus, provided by another embodiment of the present invention.

FIG. 3 is a schematic structural view of an information storage device for an image forming apparatus, provided by another embodiment of the present invention. As illustrated in FIG. 3, on the basis of the above embodiments, furthermore, the image forming change information and the backup information stored into each foregoing storage unit 302 at least include an identical type of variable information.

The second control unit 305 specifically includes a first acquisition subunit 3051, a first determination subunit 3052 and a first information reset subunit 3053, wherein the first acquisition subunit 3051 is configured to respectively acquire corresponding backup information and corresponding image forming change information from each storage unit 302 corresponding to each communication interface 301 disconnected with the controller, and respectively compare the identical type of variable information in the image forming change information and the backup information in the corresponding storage unit 302 so as to acquire the difference values of various variable;

the first determination subunit 3052 is configured to generate a first trigger sub-signal when determining and acquiring that at least one difference value of the variable is more than the predetermined threshold; and the first information reset subunit 3053 is configured to at least rewrite the image forming change information in the corresponding storage unit into the backup information when receiving the first trigger sub-signal.

The identical type of variable information indicates the information of the same type, namely the relevant information describing the same performance index of the image forming cartridge. For example, if the image forming change information includes information describing the remaining amount or the consumption of the image forming cartridge, the backup information also includes information describing the remaining amount or the consumption of the image forming cartridge. The difference is that: the remaining amount and the consumption in the image forming change information are variable and are the remaining amount and the consumption of the current image forming cartridge, but the remaining amount and the consumption in the backup information are fixed and are the remaining amount and the consumption of the image forming cartridge in the initial state.

When receiving the second trigger signal and respectively acquiring the corresponding backup information and the corresponding image forming change information in each storage unit corresponding to each communication interface disconnected with the controller, the first acquisition subunit compares the remaining amount or the consumption in the image forming change information in the corresponding storage unit with the remaining amount or the consumption in the backup information, obtains a difference value of the remaining amount or the consumption, and rewrites the image forming change information in the storage unit into the backup information if the difference value is more than the predetermined threshold, namely rewriting the remaining amount or the consumption of the current image forming cartridge into the remaining amount or the consumption of the image forming cartridge in the initial state, i.e., resetting the image forming change information in the storage unit.

On the contrary, if the difference value obtained after the remaining amount or the consumption in the image forming change information in the corresponding storage unit is compared with the remaining amount or the consumption in the backup information is less than the predetermined threshold, the image forming change information is not necessarily rewritten into the backup information, namely not resetting the image forming change information in the storage unit.

The predetermined threshold indicates the variation limit value of parameters, having an identical type of variable information, in the image forming change information and the backup information. If the difference value obtained after comparison is more than the predetermined threshold, it indicates that the image forming change information is greatly changed compared with the backup information, and hence the image forming change information must be reset. If the difference value obtained after comparison is less than the predetermined threshold, it indicates that the image forming change information is not changed or slightly changed compared with the backup information, and hence the image forming change information is not necessarily reset. The threshold can be set as required.

In the embodiment, the variation limit value of parameters, having the an identical type of variable information, in the image forming change information and the backup information is taken as the predetermined condition for determining whether to rewrite the image forming change information in the storage unit corresponding to the communication interface disconnected with the controller into the backup information. Of courses, other methods can be also taken as the predetermined condition which is not limited to those described in the embodiment. For example, the following methods can be also taken as the predetermined condition: determining whether to reach the frequency for limiting the repetitive use of the information storage device so as to ensure the reset frequency in the case of low failure rate; or alternatively, determining whether a mounting flag has been generated or determining whether the date of initial installation has been generated in the variable information.

In another embodiment, a flag is also stored into each foregoing storage unit in the information storage device.

The second control unit may specifically include a second acquisition subunit, a second determination subunit and a second information reset subunit, wherein the second acquisition subunit is configured to acquire the flag from each foregoing storage unit when receiving the second trigger signal, and rewrite the flag in the corresponding storage unit from a first state to a second state when determining and acquiring that the communication interface corresponding to the storage unit is connected with the controller;

the second determination subunit is configured to generate a second trigger sub-signal when determining and acquiring that the storage unit corresponding to the communication interface disconnected with the controller is in the second state; and the second information reset subunit is configured to at least rewrite the image forming change information in the corresponding storage unit into the backup information when receiving the second trigger sub-signal.

In the embodiment, a flag is arranged inside each storage unit. When the communication interface is connected with the controller, the state of the flag in the corresponding storage unit is rewritten through the control unit from the first state to the second state. For example, if the communication interface has not been connected with the controller, the flag in the storage unit is "0"; and if the communication interface is connected with the controller, the flag in the storage unit is rewritten into "1".

If the flag in the storage unit has been rewritten from the first state to the second state, it indicates that the communication interface corresponding to the storage unit has been connected with the controller, and that the controller and the storage unit have been subjected to information interaction, and hence the controller can determine that the image forming change information in the storage unit has been changed. Therefore, if the control unit determines that the flag in the storage unit is in the second state, when the communication interface corresponding to the storage unit is disconnected with the controller, the image forming change information in the storage unit is reset, that is to say, the image forming change information in the storage unit is rewritten into the backup information. On the contrary, if the control unit determines that the flag in the storage unit is in the first state, it indicates that the controller and the storage unit have not been subjected to information interaction, and hence the controller can determine that the image forming change information in the storage unit has not been changed. Therefore, when the communication interface corresponding to the storage unit is disconnected with the controller, the image forming change information in the storage unit is not necessarily reset.

In the embodiment, the storage unit is selectively reset by adoption of the above determination means as the predetermined condition for determining whether to rewrite the image forming change information in the storage unit corresponding to the communication interface disconnected with the controller into the backup information. Therefore, the service life of the information storage device can be prolonged.

On the basis of the above embodiment, furthermore, the backup information stored into each foregoing storage unit in the information storage device also includes second product information.

The second control unit is specifically configured to rewrite the image forming change information in the storage unit corresponding to the communication interface disconnected with the controller into the initial state information of the image forming cartridge and rewrite the first product information into the second product information when receiving the second trigger signal or when the second trigger signal is received and the predetermined condition is met.

In the embodiment, the backup information in each storage unit at least includes the initial state information of the image forming cartridge and the second product information. At this point, the second control unit not only rewrites the image forming change information in the storage unit corresponding to the communication interface disconnected with the controller into the backup information but also rewrites the first product information into the second product information when resetting the image forming change information, namely rewriting the variable information completely, when receiving the second trigger signal or when the second trigger signal is received and the predetermined condition is met.

In specific applications, as the first product information in the variable information and the second product information in the backup information are usually identical with each other and not changed at all, or alternatively, the backup information only includes the initial state information of the image forming cartridge, only the image forming change information in the variable information is rewritten into the initial state information of the image forming cartridge in the backup information but the first product information in the variable information is not rewritten, as described in the above embodiment.

On the basis of the above embodiment, furthermore, the backup information stored into each foregoing storage unit in the information storage device also includes the estimated service life, and the image forming change information at least includes the expiration date.

The information storage device further comprises a first information update unit configured to read the estimated service life and the expiration date in each foregoing storage unit so as to acquire the expiration date to be updated.

The second control unit is also configured to rewrite the expiration date in the image forming change information in the storage unit corresponding to the communication interface disconnected with the controller into the expiration date to be updated when receiving the second trigger signal.

Or alternatively, in another embodiment, the backup information stored into each foregoing storage unit in the information storage device also includes the estimated service life, and the image forming change information at least includes the shelf life.

The information storage device further comprises a second information update unit configured to read the estimated service life and the shelf life in each foregoing storage unit so as to acquire the shelf life to be updated.

The second control unit is also configured to rewrite the shelf life in the image forming change information in the storage unit corresponding to the communication interface disconnected with the controller into the shelf life to be updated when receiving the second trigger signal.

In the above embodiments, the estimated service life refers to the service life of the colorant in the image forming cartridge of the image forming apparatus, estimated under normal use conditions; the expiration date refers to the expiration date of the colorant in the image forming cartridge of the image forming apparatus; and the shelf life refers to the shelf life starting from the date of initial installation. In general, when an image forming cartridge package is opened, the colorant also has certain shelf life.

When the backup information includes the estimated service life and the image forming change information includes the expiration date, the first information update unit can acquire the expiration date to be updated according to the estimated service life and the expiration date read from the storage unit. The expiration date to be updated refers to the expiration date to be postponed for the estimated service life. For example, if the estimated service life of the colorant in the image forming cartridge is 6 months and the expiration date is Jan. 1, 2012, the expiration date to be updated acquired by the first control unit is Jul. 1, 2012 in the case of the next reset operation, namely 6 months postponed since the expiration date of Jan. 1, 2012.

Or alternatively, when the backup information includes the estimated service life and the image forming change information includes the shelf life, the second information update unit can acquire the shelf life to be updated according to the estimated service life and the shelf life read from the storage unit. The shelf life to be updated refers to the duration of the shelf life plus the estimated service life. For example, if the estimated service life of the colorant in the image forming cartridge is 6 months and the shelf life is 1 year, the shelf life to be updated acquired by the first control unit is one year and a half in the case of the next reset operation.

The information stored into the information storage device is resettable, that is to say, the information storage device can be repetitively used. When an image forming cartridge is repetitively used on an image forming apparatus, after the image forming cartridge is refilled with the colorant each time when the colorant in the image forming cartridge is used out, the information storage device is removed at the same time and rearranged on the image forming cartridge refilled with the colorant, and another different communication interface is enabled to be connected with a controller in the image forming apparatus; and hence, the controller acquires the estimated service life in the backup information and the expiration date in the image forming change information or the estimated service life in the backup information and the shelf life in the image forming change information, from the storage unit corresponding to the communication interface. As the colorant in the image forming cartridge is newly refilled, the expiration date and the shelf life of the colorant should be recalculated, that is to say, the expiration date at this point should be the expiration date to be updated and the shelf life at this point should be the shelf life to be updated, so that the controller can acquire correct expiration date or shelf life from the information storage device and hence control the image forming apparatus to continue to execute the image forming task. Therefore, the following case can be avoided: the controller generates a control signal for controlling the image forming apparatus to stop image forming when determining that the colorant in the image forming cartridge has expired according to the expiration date or the shelf life not updated, so that the image forming apparatus cannot execute the image forming task.

Figure 4:
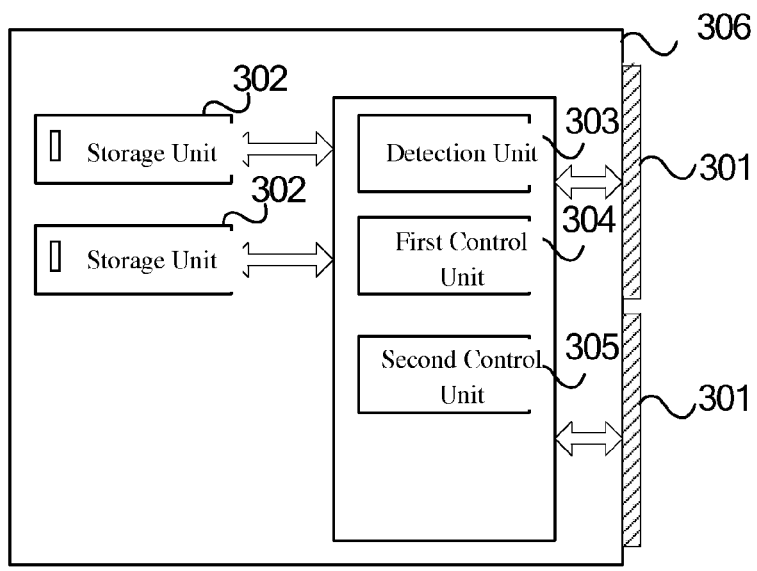
FIG. 4 is a schematic structural view of an information storage device for the image forming apparatus, provided by another embodiment of the present invention.

FIG. 4 is a schematic structural view of an information storage device for an image forming apparatus, provided by another embodiment of the present invention. On the basis of the above embodiment, furthermore, in the information storage device, the number of communication interfaces 301 and the number of storage units 302 are two; and each foregoing communication interface 301, each foregoing storage unit 302, a detection unit 303, a first control unit 304 and a second control unit 305 are respectively arranged on a circuit board 306. As both the two communication interfaces 301 are arranged on a wall surface on the same side of the circuit board 306, different communication interfaces can be connected with a controller of the image forming apparatus in turn by rotation of the circuit board for 90 degrees, 180 degrees, 270 degrees or the like when the information storage device is arranged on the image forming cartridge.

Figure 5:
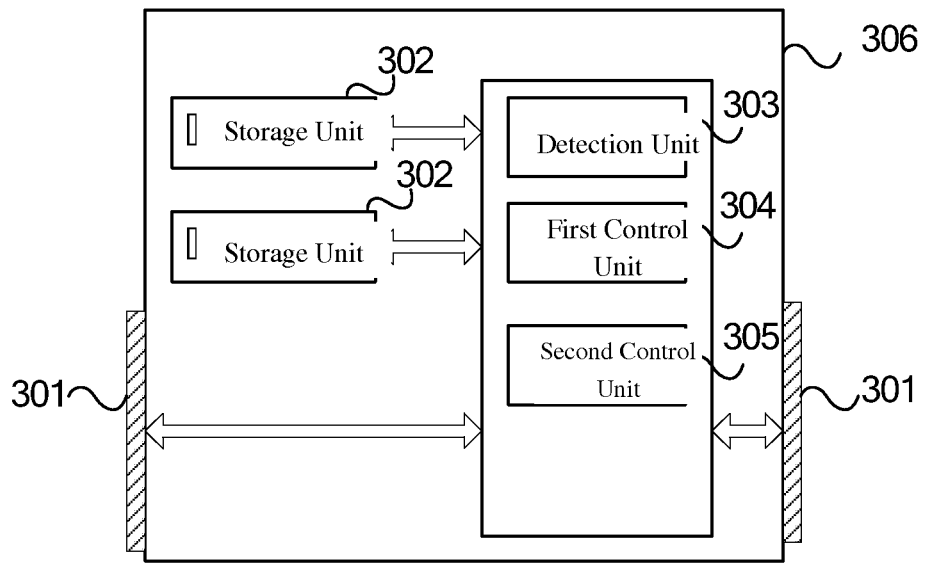
FIG. 5 is a schematic structural view of an information storage device for the image forming apparatus, provided by another embodiment of the present invention.

FIG. 5 is a schematic structural view of an information storage device for an image forming apparatus, provided by another embodiment of the present invention. As illustrated in FIG. 5, in the information storage device, the number of communication interfaces 301 and the number of storage units 302 are two; and each foregoing communication interface 301, each foregoing storage unit 302, a detection unit 303, a first control unit 304 and a second control unit 305 are respectively arranged on a circuit board 306. As the two communication interfaces 301 are arranged on wall surfaces on different sides of the circuit board 306, different communication interfaces can be connected with a controller of the image forming apparatus in turn by the reversal of the circuit board for 180 degrees or by rotation of the circuit board for certain angle after the reversal of 180 degrees when the information storage device is arranged on the image forming cartridge.

In the information storage device provided by the embodiments as illustrated in FIGS. 4 and 5, the number of the communication interfaces, the number of the storage units and the setting means of the communication interfaces in the information storage device are defined. Moreover, the detection unit, the first control unit, the second control unit, the communication interfaces and the storage units are all arranged on the circuit board, so that the information storage device can be conveniently arranged on the image forming cartridge of the image forming apparatus through the circuit board.

However, the number of the communication interfaces and the number of the storage units in the information storage device can be set as required and not limited to those as described in the above embodiments; the detection unit, the first control unit, the second control unit, the communication interfaces and the storage units may be also not arranged on the circuit board and can be respectively arranged on the image forming cartridge in the image forming apparatus; or alternatively, the detection unit, the first control unit, the second control unit, the communication interfaces and the storage units are arranged on a mounting board of another type, so that the information storage device can be arranged on the image forming cartridge of the image forming apparatus through the mounting board.

On the basis of the above embodiments, in the information storage device, signal indicators can be also respectively arranged on each foregoing communication interface. When the communication interface is connected with the controller, the signal indicator corresponding to the communication interface is illuminated.

Figure 6:
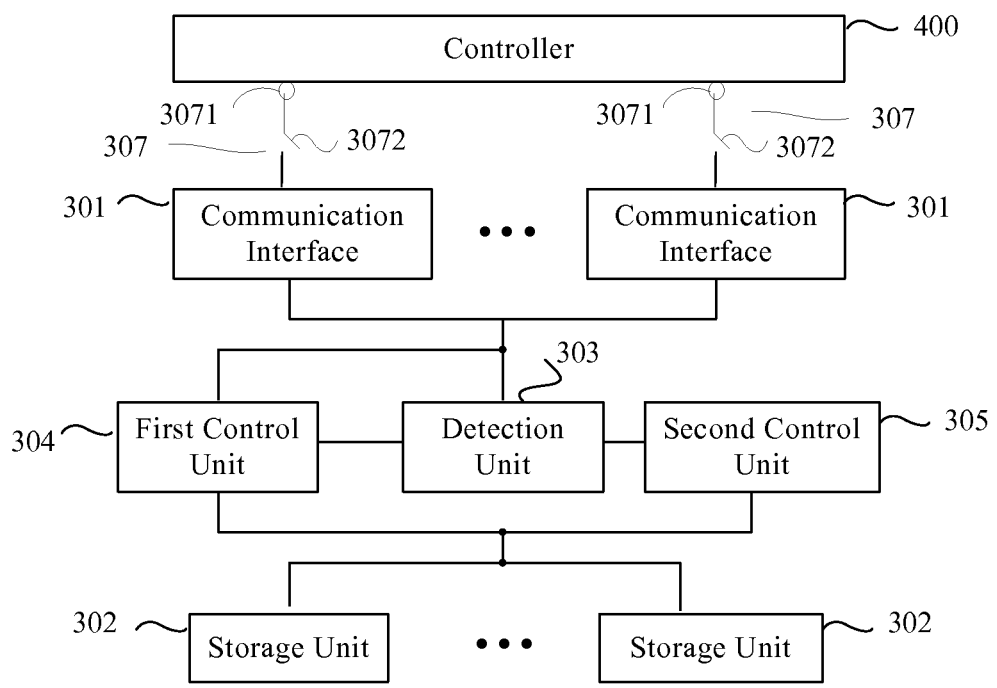
FIG. 6 is a schematic structural view of an information storage device for the image forming apparatus, provided by another embodiment of the present invention.

FIG. 6 is a schematic structural view of an information storage device for an image forming apparatus, provided by another embodiment of the present invention. As illustrated in FIG. 3, furthermore, in the information storage device, a switch 307 is respectively arranged between each foregoing communication interface 301 and a controller 400; first ends 3071 of the switches 307 are connected with the controller 400; second ends 3072 of the switches 307 are connected with each communication interface 301 by switching; and the connected or disconnected state of the controller 400 and each communication interface 301 is controlled by the switching of the position of the second ends 3072 of the switches 307.

In the embodiment, the connected or disconnected state of each communication interface and the controller can be controlled by the arrangement of the switches. In this way, when the user replaces the image forming cartridge with a new one or refills the image forming cartridge with the colorant, the information storage device is removed at the same time and arranged on the replaced image forming cartridge or rearranged on the image forming cartridge refilled with the colorant, and the connected or disconnected state of the communication interfaces and the controller can be changed by the manual control of the position of the second ends of the switches. At this point, another communication interface corresponding to another position can be connected with the controller only by the switching of the second end of the switch to the position different from that before the replacement. Therefore, the following case can be avoided: when the information storage device is rearranged, as the user does not remember the position of the communication interface before and after the replacement, the same communication interface before and after the replacement is enabled to be connected with the controller, and hence the improper connection between the communication interface and the controller can be caused, and consequently the image forming apparatus cannot correctly execute the image forming task.

The embodiment of the present invention also provides an image forming cartridge, wherein the image forming cartridge is arranged inside an image forming apparatus, and an information storage device provided by the embodiment of the present invention is arranged on the image forming cartridge; and wherein a controller on the image forming apparatus is connected with one communication interface in the information storage device; and the controller is configured to receive variable information in a storage unit corresponding to a communication interface connected with the controller, sent by a first control unit in the information storage device, and send generated updated image forming change information to the storage unit corresponding to the communication interface through the communication interface so that the information can be stored into the storage unit.

The image forming cartridge provided by the embodiment of the present invention adopts the information storage device provided by the embodiment of the present invention. When the colorant is used out or insufficient, the information storage device cannot be automatically reset. At this point, the image forming apparatus will stop executing the image forming task until the user replaces the image forming cartridge or refills the image forming cartridge with the colorant, and the information storage device is removed at the same time and arranged on the replaced image forming cartridge or rearranged on the image forming cartridge refilled with the colorant. Moreover, after another communication interface is enabled to be connected with the controller, the controller in the image forming apparatus can acquire relatively correct image forming change information from the information storage device. And hence, the following case can be avoided: the controller continues to generate a control signal to control a corresponding component in the image forming apparatus to execute the image forming task due to the acquisition of improper image forming change information, but actually the colorant has been used out and the image forming task cannot be finished, and hence the image forming process can be interrupted. Therefore, the quality of executing the image forming task of the image forming apparatus can be improved.

Figure 7:
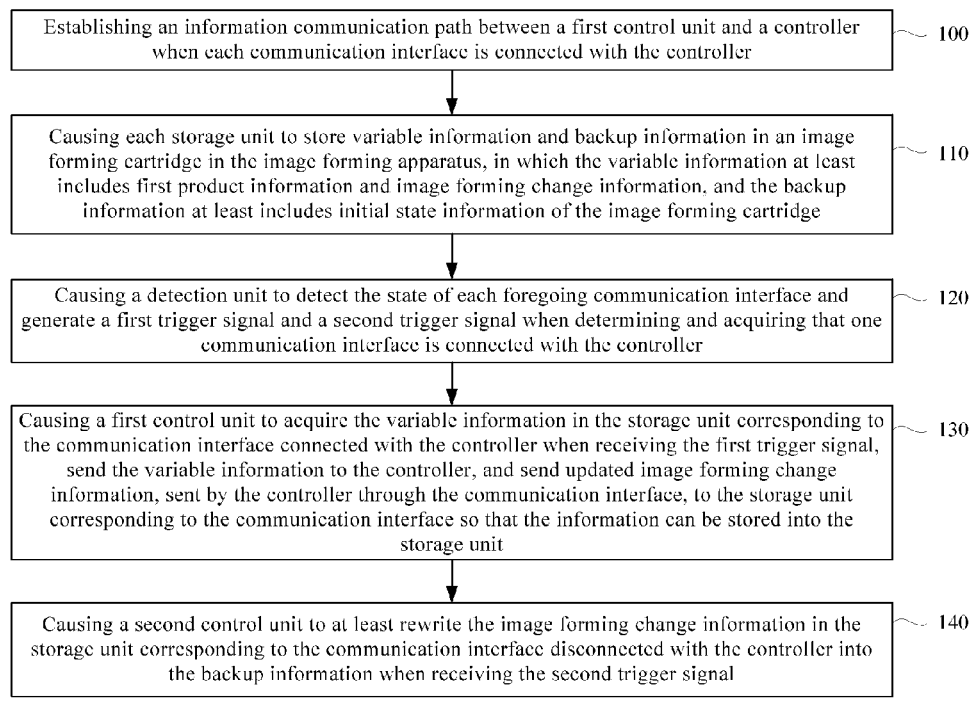
FIG. 7 is a flowchart of a reset method employing the information storage device for the image forming apparatus provided by the embodiment of the present invention, in accordance with an embodiment of the present invention.

The embodiment of the present invention also provides a reset method employing the information storage device for the image forming apparatus provided by the embodiment of the present invention. FIG. 7 is a flowchart of the reset method employing the information storage device for the image forming apparatus provided by the embodiment of the present invention, in accordance with the embodiment of the present invention. As illustrated in FIG. 7, the reset method comprises the following steps of:

step 100: establishing an information communication path between a first control unit and a controller when each communication interface is connected with the controller;

step 110: causing each storage unit to store variable information and backup information in an image forming cartridge in the image forming apparatus, in which the variable information at least includes first product information and image forming change information, and the backup information at least includes initial state information of the image forming cartridge;

step 120: causing a detection unit to detect the state of each foregoing communication interface and generate a first trigger signal and a second trigger signal when determining and acquiring that one communication interface is connected with the controller;

step 130: causing a first control unit to acquire the variable information in the storage unit corresponding to the communication interface connected with the controller when receiving the first trigger signal, send the variable information to the controller, and send updated image forming change information, sent by the controller through the communication interface, to the storage unit corresponding to the communication interface so that the information can be stored into the storage unit; and step 140: causing a second control unit to at least rewrite the image forming change information in the storage unit corresponding to the communication interface disconnected with the controller into the backup information when receiving the second trigger signal.

The reset method provided by the embodiment of the present invention adopts the information storage device provided by the embodiment of the present invention. The implementing principles and technical effects of the reset method are similar to those of the embodiment of the device as illustrated in FIG. 2 and will not be described further herein.

On the basis of the above embodiment, furthermore, in the reset method, the step of at least rewriting the image forming change information in the storage unit corresponding to the communication interface disconnected with the controller into the backup information, in the step 140 further comprises the step of:

causing the second control unit to at least rewrite the image forming change information in the storage unit corresponding to the communication interface disconnected with the controller into the backup information when the second trigger signal is received and the predetermined condition is met.

The reset method provided by the embodiment selectively resets the storage unit by the arrangement of the predetermined condition. Therefore, the service life of the information storage device can be prolonged.

Figure 8:
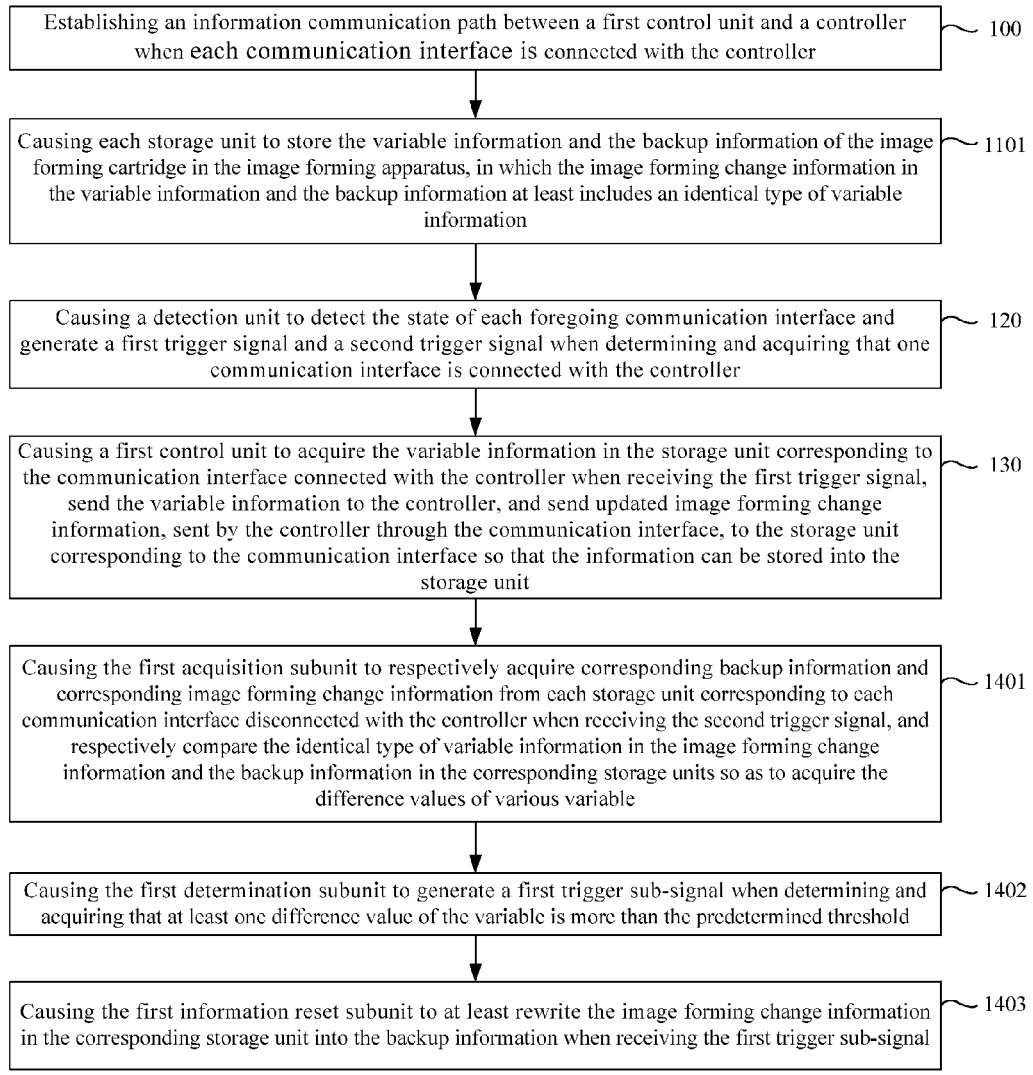
FIG. 8 is a flowchart of a reset method employing the information storage device for the image forming apparatus provided by the embodiment of the present invention, in accordance with another embodiment of the present invention.

FIG. 8 is a flowchart of a reset method employing the information storage device for the image forming apparatus provided by the embodiment of the present invention, in accordance with another embodiment of the present invention. As illustrated in FIG. 8, on the basis of the above embodiment, furthermore, the second control unit in the information storage device adopted by the reset method specifically includes a first acquisition subunit, a first determination subunit and a first information reset subunit.

The step of causing each storage unit to store the variable information and the backup information of the image forming cartridge in the image forming apparatus, in the step 110 in the reset method further comprises the following step of:

step 1101: causing each storage unit to store the variable information and the backup information of the image forming cartridge in the image forming apparatus, in which the image forming change information in the variable information and the backup information at least includes an identical type of variable information.

The step of causing the second control unit to at least rewrite the image forming change information in the storage unit corresponding to the communication interface disconnected with the controller into the backup information when the second trigger signal is received and the predetermined condition is met, in the step 140 further comprises the following steps of:

step 1401: causing the first acquisition subunit to respectively acquire corresponding backup information and corresponding image forming change information from each storage unit corresponding to each communication interface disconnected with the controller when receiving the second trigger signal, and respectively compare the identical type of variable information in the image forming change information and the backup information in the corresponding storage unit so as to acquire the difference values of various variable;

step 1402: causing the first determination subunit to generate a first trigger sub-signal when determining and acquiring that at least one difference value of the variable is more than the predetermined threshold; and step 1403: causing the first information reset subunit to at least rewrite the image forming change information in the corresponding storage unit into the backup information when receiving the first trigger sub-signal.

In the embodiment, the variation limit value of parameters, having an identical type of variable information, in the image forming change information and the backup information is taken as the predetermined condition for determining whether to rewrite the image forming change information in the storage unit corresponding to the communication interface disconnected with the controller into the backup information. Of course, other methods can be also taken as the predetermined condition which is not limited to those described in the embodiment.

In another embodiment, the second control unit in the information storage device adopted by the reset method may also specifically include a second acquisition subunit, a second determination subunit and a second information reset subunit.

In the reset method, the step of causing each foregoing storage unit to store the variable information and the backup information of the image forming cartridge in the image forming apparatus, in the step 110 further comprises the following step of:

step 1102: causing each foregoing storage unit to store a flag.

The step of causing the second control unit to at least rewrite the image forming change information in the storage unit corresponding to the communication interface disconnected with the controller into the backup information when the second trigger signal is received and the predetermined condition is met, in the step 140 further comprises the following steps of:

step 1404: causing the second acquisition subunit to acquire a flag from each foregoing storage unit when receiving the second trigger signal, and rewrite the flag in the corresponding storage unit from a first state to a second state when determining and acquiring that the communication interface corresponding to the storage unit is connected with the controller;

step 1405: causing the second determination subunit to generate a second trigger sub-signal when determining and acquiring that the flag in the storage unit corresponding to the communication interface disconnected with the controller is in the second state; and step 1406: causing the second information reset subunit to at least rewrite the image forming change information in the corresponding storage unit into the backup information when receiving the second trigger sub-signal.

In the embodiment, the storage unit is selectively reset by adoption of the above determination means as the predetermined condition for determining whether to rewrite the image forming change information in the storage unit corresponding to the communication interface disconnected with the controller into the backup information. Therefore, the service life of the information storage device can be prolonged.

On the basis of the above embodiment, in the reset method, the step of causing each foregoing storage unit to store the variable information and the backup information of the image forming cartridge in the image forming apparatus, in the step 110 further comprises the following step of:

causing each storage unit to store the variable information and the backup information of the image forming cartridge in the image forming apparatus, in which the backup information also includes second product information.

The step of causing the second control unit to at least rewrite the image forming change information in the storage unit corresponding to the communication interface disconnected with the controller into the backup information when receiving the second trigger signal, in the step 140 further comprises the following step of:

causing the second control unit to rewrite the image forming change information in the storage unit corresponding to the communication interface disconnected with the controller into the initial state information of the image forming cartridge and rewrite the first product information into the second product information, when receiving the second trigger signal or when the second trigger signal is received and the predetermined condition is met.

In the embodiment, the backup information in each storage unit at least includes the initial state information of the image forming cartridge and the second product information. At this point, the second control unit not only rewrites the image forming change information in the storage unit corresponding to the communication interface disconnected with the controller into the backup information but also rewrites the first product information into the second product information when resetting the image forming change information, namely rewriting the variable information completely, when receiving the second trigger signal or when the second trigger signal is received and the predetermined condition is met.

On the basis of the above embodiment, furthermore, the information storage device adopted by the reset method further comprises a first information update unit. In the reset method, the step of causing each foregoing storage unit to store the variable information and the backup information of the image forming cartridge in the image forming apparatus, in the step 110 further comprises the following step of:

causing each foregoing storage unit to store the variable information and the backup information of the image forming cartridge in the image forming apparatus, in which the backup information also includes the estimated service life, and the image forming change information in the variable information at least includes the first expiration date.

The reset method further comprises the following step after the step 110:

causing the first information update unit to read the estimated service life and the expiration date in each foregoing storage unit so as to acquire the expiration date to be updated.

The step 140 further comprises the following step of:

causing the second control unit to rewrite the expiration date in the image forming change information in the storage unit corresponding to the communication interface disconnected with the controller into the expiration date to be updated.

In another embodiment, the information storage device adopted by the reset method further comprises a second information update unit. In the reset method, the step of causing each foregoing storage unit to store the variable information and the backup information of the image forming cartridge in the image forming apparatus, in the step 110 further comprises the following step of:

causing each storage unit to store the variable information and the backup information of the image forming cartridge in the image forming apparatus, in which the backup information also includes the estimated service life, and the image forming change information in the variable information also includes the shelf life.

The reset method further comprises the following step after the step 110:

causing the second information update unit to read the estimated service life and the shelf life in each foregoing storage unit so as to acquire the shelf life to be updated.

The step 140 further comprises the following step of:

causing the second control unit to rewrite the shelf life in the image forming change information in the storage unit corresponding to the communication interface disconnected with the controller into the shelf life to be updated.

In the reset method provided by the above two embodiments, furthermore, the expiration date or the shelf life in the image forming change information in the information storage device is updated so that the controller can acquire proper expiration date or shelf life from the information storage device and hence control the image forming apparatus to continue to execute the image forming task. Therefore, the following case can be avoided: the controller generates a control signal for controlling the image forming apparatus to stop image forming when determining that the colorant in the image forming cartridge has expired according to the expiration date or the shelf life not updated, so that the image forming apparatus cannot execute the image forming task.

In the above embodiments, the detection unit, the first control unit and the second control unit are described as independent components. It can be understood by those skilled in the art that various units can be achieved by a microprogrammed control unit (MCU) and programs therein. Moreover, other units can also be partially achieved by software. The implementing means is not limited herein.

It can be understood by those skilled in the art that: all or part of the steps for achieving the above method embodiments can be achieved by program instruction related hardware; the foregoing program can be stored into a computer readable storage medium; the program executes the steps of the above method embodiments in the executing process; and the foregoing storage medium includes a read only memory (ROM), a random access memory (RAM), a disk, a CD-ROM or other medium capable of storing program codes.

It should be finally noted that: the above embodiments are only used for describing the technical proposals of the present invention and not intended to limit the present invention; although the present invention has been described in detail with reference to the foregoing embodiments, it should be understood by those skilled in the art that modifications can be still made by those skilled in the art to the technical proposals as described in the foregoing embodiments or part or all of the technical characteristics can be subjected to equivalent replacements, and the modifications or replacements should not allow the essence of the corresponding technical proposals to depart from the scope of the technical proposals of the embodiments of the present invention.

What is claimed is:

1. An information storage device for an image forming apparatus, comprising at least two communication interfaces, at least two storage units, a detection unit, a first control unit and a second control unit, wherein the communication interfaces configured to connect with a controller in the image forming apparatus, in the state that the communication interfaces are connected with the controller, set up a communication path between the first control unit and the controller;

the storage units are arranged in accordance with the communication interfaces and configured to store variable information and backup information of an image forming cartridge in the image forming apparatus, in which the variable information at least includes first product information and image forming change information, and the backup information at least includes initial state information of the image forming cartridge;

the detection unit connected with each foregoing communication interface and configured to detect the state of each foregoing communication interface and generate a first trigger signal and a second trigger signal when determining and acquiring that one communication interface is connected with the controller;

the first control unit respectively connected with each foregoing storage unit and the detection unit and configured to acquire the variable information in the storage unit corresponding to the communication interface connected with the controller when receiving the first trigger signal, send the variable information to the controller, and send updated image forming change information sent by the controller through said communication interface to the storage unit corresponding to said communication interface so that the information can be stored into the storage unit; and the second control unit respectively connected with each foregoing storage unit and the detection unit and configured to at least rewrite the image forming change information in the storage unit corresponding to the communication interface disconnected with the controller into the backup information when receiving the second trigger signal.

2. The information storage device for the image forming apparatus according to claim 1, wherein the second control unit specifically configured to at least rewrite the image forming change information in the storage unit corresponding to the communication interface disconnected with the controller into the backup information when the second trigger signal is received and the predetermined condition is met.

3. The information storage device for the image forming apparatus according to claim 2, wherein the image forming change information and the backup information in each foregoing storage unit at least include an identical type of variable information; and the second control unit specifically includes:

a first acquisition subunit configured to respectively acquire corresponding backup information and corresponding image forming change information from each storage unit corresponding to each communication interface disconnected with the controller when receiving the second trigger signal, and respectively compare the identical type of variable information in the image forming change information and the backup information in the corresponding storage unit so as to acquire the difference values of various variable;

a first determination subunit configured to generate a first trigger sub-signal when determining and acquiring that at least one difference value of the variable is more than the predetermined threshold; and a first information reset subunit configured to at least rewrite the image forming change information in the corresponding storage unit into the backup information when receiving the first trigger sub-signal.

4. An image forming cartridge arranged inside an image forming apparatus, characterized in that: an information storage device according to claim 3 arranged on the image forming apparatus; a controller on the image forming apparatus connected with one communication interface in the information storage device; and the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

5. The information storage device for the image forming apparatus according to claim 2, wherein
a flag is also stored into each foregoing storage unit; and
the second control unit specifically includes:
a second acquisition subunit configured to acquire the flag from each foregoing storage unit when receiving the second trigger signal, and rewrite the flag in the corresponding storage unit from a first state to a second state when determining and acquiring that the communication interface corresponding to the storage unit is connected with the controller;
a second determination subunit configured to generate a second trigger sub-signal when determining and acquiring that the flag in the storage unit corresponding to the communication interface disconnected with the controller is in the second state; and
a second information reset subunit configured to at least rewrite the image forming change information in the corresponding storage unit into the backup information when receiving the second trigger sub-signal.

6. An image forming cartridge arranged inside an image forming apparatus, characterized in that: an information storage device according to claim 5 arranged on the image forming apparatus; a controller on the image forming apparatus connected with one communication interface in the information storage device; and
the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

7. The information storage device for the image forming apparatus according to claim 2, wherein
the backup information stored into each foregoing storage unit also includes the estimated service life, and the image forming change information at least includes the expiration date;
the information storage device further comprises:
a first information update unit configured to read the estimated service life and the expiration date in each foregoing storage unit so as to acquire the expiration date to be updated; and
the second control unit further configured to rewrite the expiration date in the image forming change information in the storage unit corresponding to the communication interface disconnected with the controller into the expiration date to be updated when receiving the second trigger signal.

8. An image forming cartridge arranged inside an image forming apparatus, characterized in that: an information storage device according to claim 7 arranged on the image forming apparatus; a controller on the image forming apparatus connected with one communication interface in the information storage device; and
the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

9. The information storage device for the image forming apparatus according to claim 2, wherein
the backup information stored into each foregoing storage unit also includes the estimated service life, and the image forming change information at least includes the shelf life;
the information storage device further comprises:
a second information update unit configured to read the estimated service life and the shelf life in each foregoing storage unit so as to acquire the shelf life to be updated; and
the second control unit further configured to rewrite the shelf life in the image forming change information in the storage unit corresponding to the communication interface disconnected with the controller into the shelf life to be updated.

10. An image forming cartridge arranged inside an image forming apparatus, characterized in that: an information storage device according to claim 9 arranged on the image forming apparatus; a controller on the image forming apparatus connected with one communication interface in the information storage device; and
the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

11. An image forming cartridge arranged inside an image forming apparatus, characterized in that: an information storage device according to claim 2 arranged on the image forming apparatus; a controller on the image forming apparatus connected with one communication interface in the information storage device; and
the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

12. The information storage device for the image forming apparatus according to claim 1, wherein
the backup information stored into each foregoing storage unit also includes second product information; and
the second control unit specifically configured to rewrite the image forming change information in the storage unit corresponding to the communication interface disconnected with the controller into the initial state information of the image forming cartridge and rewrite the first product information into the second product information, when receiving the second trigger signal, or, when the second trigger signal is received and the predetermined condition is met.

13. An image forming cartridge arranged inside an image forming apparatus, characterized in that: an information storage device according to claim 12 arranged on the image forming apparatus; a controller on the image forming apparatus connected with one communication interface in the information storage device; and the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

14. The information storage device for the image forming apparatus according to claim 1, wherein the number of the communication interfaces and the number of the storage units are respectively two; each foregoing communication interface, each foregoing storage unit, the detection unit, the first control unit and the second control unit are respectively arranged on a circuit board; and both the two communication interfaces are arranged on a wall surface on the same side of the circuit board.

15. An image forming cartridge arranged inside an image forming apparatus, characterized in that: an information storage device according to claim 14 arranged on the image forming apparatus; a controller on the image forming apparatus connected with one communication interface in the information storage device; and the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

16. The information storage device for the image forming apparatus according to claim 1, wherein the number of the communication interfaces and the number of the storage units are respectively two; each foregoing communication interface, each foregoing storage unit, the detection unit, the first control unit and the second control unit are respectively arranged on a circuit board; and the two communication interfaces are respectively arranged on wall surfaces on different sides of the circuit board.

17. An image forming cartridge arranged inside an image forming apparatus, characterized in that: an information storage device according to claim 16 arranged on the image forming apparatus; a controller on the image forming apparatus connected with one communication interface in the information storage device; and the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

18. An image forming cartridge arranged inside an image forming apparatus, characterized in that: an information storage device according to claim 1 arranged on the image forming apparatus; a controller on the image forming apparatus connected with one communication interface in the information storage device; and the controller configured to receive variable information in a storage unit corresponding to a communication interface connected with the controller, sent by a first control unit in the information storage device, and send generated updated image forming change information to the storage unit corresponding to said communication interface through the communication interface so that the information can be stored into the storage unit.

\* \* \* \* \*